(12) United States Patent
Parikh et al.

(10) Patent No.: US 9,328,655 B2
(45) Date of Patent: May 3, 2016

(54) METHODS AND SYSTEMS FOR COOLING EXHAUST SYSTEM COMPONENTS

(71) Applicant: General Electric Company, Schenectady, NY (US)

(72) Inventors: Chirag Bipinchandra Parikh, Erie, PA (US); Jayesh Jain, Bangalore (IN); Eric David Peters, Erie, PA (US)

(73) Assignee: General Electric Company, Schenectady, NY (US)

( * ) Notice: Subject to any disclaimer, the term of this patent is extended or adjusted under 35 U.S.C. 154(b) by 75 days.

(21) Appl. No.: 14/183,087

(22) Filed: Feb. 18, 2014

(65) Prior Publication Data

US 2014/0230799 A1   Aug. 21, 2014

Related U.S. Application Data

(63) Continuation-in-part of application No. 13/769,107, filed on Feb. 15, 2013.

(51) Int. Cl.
| | |
|---|---|
| *F01N 3/00* | (2006.01) |
| *F02B 37/12* | (2006.01) |
| *F01N 3/05* | (2006.01) |
| *F02B 37/013* | (2006.01) |
| *F02B 37/18* | (2006.01) |
| *F02M 25/07* | (2006.01) |

(52) U.S. Cl.
CPC .............. *F02B 37/127* (2013.01); *F01N 3/055* (2013.01); *F02B 37/013* (2013.01); *F02B 37/18* (2013.01); *F02M 25/0711* (2013.01); *F01N 2260/02* (2013.01); *Y02T 10/121* (2013.01); *Y02T 10/144* (2013.01); *Y02T 10/20* (2013.01)

(58) Field of Classification Search
CPC ........................................................ F01P 1/08
USPC ................... 60/324, 320; 251/305, 129.11
See application file for complete search history.

(56) References Cited

U.S. PATENT DOCUMENTS

| | | | | |
|---|---|---|---|---|
| 4,539,812 | A * | 9/1985 | Rezy ............................... | 60/304 |
| 5,811,967 | A * | 9/1998 | Shank et al. ............. | 324/207.24 |
| 8,250,865 | B2 | 8/2012 | Pearson | |
| 2010/0043429 | A1 * | 2/2010 | Wolk et al. ...................... | 60/602 |
| 2012/0096849 | A1 * | 4/2012 | Cunningham et al. ........ | 60/547.1 |

OTHER PUBLICATIONS

LiskWebsite; Linear Solenoid Design Guide and Technical Information—GW Lisk Company, Inc.; 2013.

* cited by examiner

*Primary Examiner* — Kenneth Bomberg
*Assistant Examiner* — Anthony Ayala Delgado
(74) *Attorney, Agent, or Firm* — GE Global Patent Operation; John A. Kramer

(57) ABSTRACT

Various methods and systems are provided for cooling exhaust system components. In one example, a system comprises heat shield surrounding at least a part of an engine exhaust passage valve positioned in an engine exhaust passage of an engine, and an air jet configured to direct compressed air into the heat shield. The heat shield contains the compressed air around an exterior of the at least the part of the engine exhaust passage valve.

18 Claims, 8 Drawing Sheets

METHODS AND SYSTEMS FOR COOLING EXHAUST SYSTEM COMPONENTS

CROSS-REFERENCE TO RELATED APPLICATIONS

This application is a continuation-in-part of U.S. patent application Ser. No. 13/769,107 filed Feb. 15, 2013, the disclosure of which is incorporated by reference in its entirety for all purposes.

FIELD

Embodiments of the subject matter disclosed herein relate to an engine, engine components, and an engine system, for example.

BACKGROUND

Internal combustion engines release high-temperature exhaust gas via an exhaust system. Frequently, the components of the exhaust system are exposed to the high temperature of the exhaust gas. To ensure degradation to the components does not occur, the components may be designed to withstand the high temperatures and/or may be insulated from the heat exposure. However, this may result in increased manufacturing costs and bulky components. Further, degradation of the components may still occur if exhaust leaks out the exhaust passage or if the thermal insulating material becomes damaged.

BRIEF DESCRIPTION

In one embodiment, a system comprises heat shield surrounding at least a part of an engine exhaust passage valve positioned in an engine exhaust passage of an engine, and an air jet configured to direct compressed air into the heat shield. The heat shield at least partially contains the compressed air around an exterior of the at least the part of the engine exhaust passage valve. In this way, the heat shield may block excess heat from reaching the engine exhaust passage while providing a path through which compressed air may be routed to cool the surfaces of the engine exhaust passage valve. By cooling the exhaust passage valve with compressed air, thermally loaded parts and/or extra insulating materials may be reduced or dispensed with.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems of cooling engine exhaust passage valves using compressed air. In one example, the engine exhaust passage valve may be located in an exhaust system of a rail vehicle, such as a locomotive. The locomotive may have a large supply of compressed air from an air compression system, used to actuate the vehicle brakes, for example. A portion of the compressed air may be routed to one or more air jets positioned to direct air on the surface of the exhaust passage valves via a heat shield. In this way, the exhaust passage valves may be maintained at a relatively low temperature, without diverting air from the engine intake system. However, in some embodiments, compressed intake air from downstream a turbocharger compressor may be used to cool the exhaust passage valve.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example of a mobile platform supporting a system incorporating an embodiment of the invention.

Figure 1:
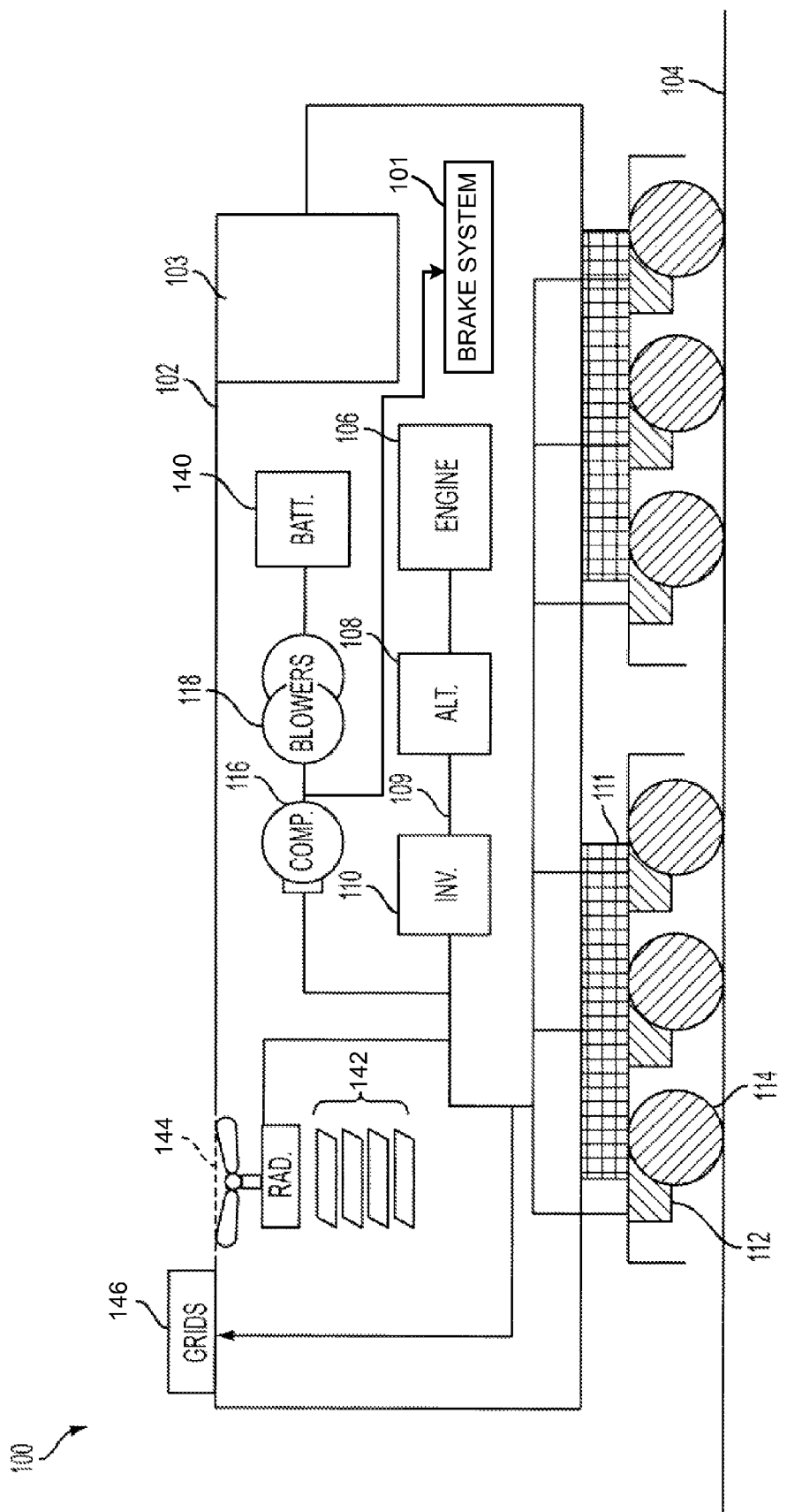
FIG. 1 schematically shows an example of a rail vehicle system including an engine.

Before further discussion of the approach for cooling exhaust passage valves, an example of a platform is disclosed in which the engine system may be installed in a vehicle, such as a rail vehicle. FIG. 1 is a block diagram of an exemplary rail vehicle system 100 (hereafter referred to as "rail vehicle 100"), configured to run on track 104. As depicted herein, in one example, the rail vehicle is a diesel electric vehicle operating a diesel engine 106 located within a main engine housing 102. However, in alternate embodiments of rail vehicle 100, alternate engine configurations may be employed, such as a gasoline engine or a bio diesel or natural gas engine, for example. Vehicle operating crew and electronic components involved in systems control and management may be housed within a cab 103.

The diesel engine generates a torque that is transmitted to an alternator 108 along a drive shaft (not shown). The generated torque is used by alternator 108 to generate electricity for subsequent propulsion of the vehicle. Engine 106 may be run at a constant speed, thereby generating a constant horsepower (hp) output. It will be appreciated that the engine may also be run at variable speed and variable horsepower, depending on operational demand. The electrical power generated in this manner may be referred to as the prime mover power. The electrical power may be transmitted along an electrical bus 109 to a variety of downstream electrical components. Based on the nature of the generated electrical output, the electrical bus may be a direct current (DC) bus (as depicted) or an alternating current (AC) bus. Auxiliary alternators generating smaller amounts of power (auxiliary power) for auxiliary components such as air conditioning, heating, etc, may be optionally provided in alternate embodiments of rail vehicle 100. The auxiliary power may be transmitted along an auxiliary bus. Alternatively, a common electrical bus may be used for the prime mover power and the auxiliary power.

Alternator 108 may be connected in series to one, or more, rectifiers that convert the alternator's electrical output to DC electrical power prior to transmission along the DC bus 109. Based on the configuration of a downstream electrical component receiving power from the DC bus, an inverter may be used to convert the DC electrical power to AC electrical power. In one embodiment of rail vehicle 100, a single inverter 110 may supply AC electrical power from the DC electrical bus to a plurality of components. In an alternate embodiment, each of a plurality of distinct inverters may supply electrical power to a distinct component. It will be appreciated that in alternative embodiments, the locomotive may include one or more inverters connected to a switch that may be controlled to selectively provide electrical power to different components connected to the switch.

A traction motor 112, mounted on a truck 111 below the main engine housing 102, may receive electrical power from alternator 108 via DC bus 109 to provide tractive power to propel the vehicle. As described herein, fraction motor 112 may be an AC motor. Accordingly, an inverter paired with the traction motor may convert the DC input to an appropriate AC input, such as a three-phase AC input, for subsequent use by the traction motor. In alternate embodiments, traction motor 112 may be a DC motor directly employing the output of the alternator after rectification and transmission along the DC bus. One example locomotive configuration includes one inverter/traction motor pair per wheel axle 114. As depicted herein, six inverter-traction motor pairs are shown for each of six axle-wheel pairs of the locomotive. In alternate embodiments, rail vehicle 100 may be configured with four inverter/traction motor pairs, for example.

Traction motor 112 may also be configured to act as a generator providing dynamic braking to brake vehicle 100. In particular, during dynamic braking, the traction motor may provide torque in a direction that is opposite from the rolling direction thereby generating electricity that is dissipated as heat by a grid of resistors 146 connected to the electrical bus. In one example, the grid includes stacks of resistive elements connected in series directly to the electrical bus. The stacks of resistive elements may be positioned proximate to the ceiling of main engine housing 102 in order to facilitate air cooling and heat dissipation from the grid.

Air brakes 101 making use of compressed air may be used by rail vehicle 100 as part of a vehicle braking system. The compressed air may be generated by compressing ambient air via compressor 116.

A multitude of electric machine driven airflow devices may be operated for temperature control of locomotive components. The airflow devices may include, but are not limited to, blowers, radiators, and fans. Each airflow device may be coupled to an electric machine such as a motor, which, when enabled, may convert a received electrical input into a rotational motion of the airflow device, thereby generating an active flow of air through the airflow device. It will be appreciated that in another aspect of the airflow device, the enabled motor may be operated as a generator wherein a rotational motion of the airflow device, as may be generated by a flow of air through the device, is converted to an electrical form of energy. Depicted herein, blowers 118 may be provided for the forced-air cooling of a number of electrical components, such as alternator 108 or traction motors. A grid blower (not shown) may blow air to cool the grid of resistors 146. Additional primary and auxiliary blowers may be configured to blow air to cool other primary and auxiliary electrical components.

The engine temperature is maintained in part by a radiator 144. Water may be circulated around engine 106 to absorb excess heat and contain the temperature within a desired range for efficient engine operation. The heated water may then be passed through radiator 144 wherein air blown through the radiator fan cools the heated water. The flow of air through the radiator fan may be further adjusted with the help of louvers 142, vents (not shown), air ducts (not shown), or a combination thereof.

A system electrical energy storage device 140, depicted as a battery in this example (and also referred to as "system battery 140"), may also be linked to DC bus 109. A DC-DC converter (not shown) may be configured between DC bus 109 and battery 140 to allow the high voltage of the DC bus (for example in the range of 1000V) to be stepped down appropriately for use by the battery (for example in the range of 12-75V). In the case of a hybrid locomotive, the on-board electrical energy storage device may be in the form of high voltage batteries, such that the placement of an intermediate DC-DC converter may not be necessitated. The battery may be charged by running the engine 106. The electrical energy stored in the battery may be used during a stand-by mode of engine operation, or when the engine is shutdown, to operate various electronic components such as lights, on-board monitoring systems, microprocessors, processor displays, climate controls, and the like. Battery 140 may also be used to provide an initial charge to start-up the engine 106 from a shutdown condition. In alternate embodiments, the electrical energy storage device 140 may be a super-capacitor, for example.

Figure 2:
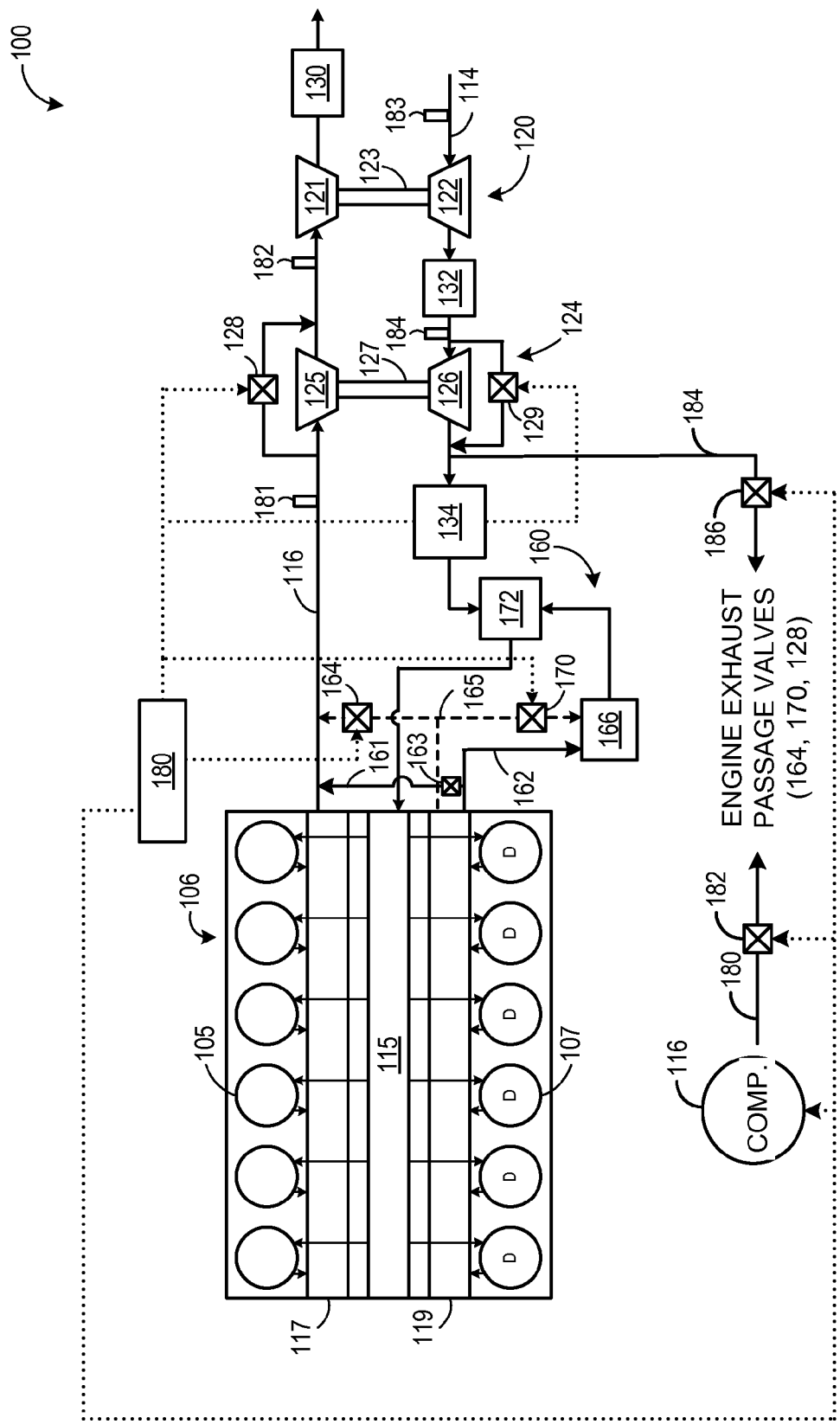
FIG. 2 schematically shows the engine of FIG. 1 and associated components.

Referring now to FIG. 2, additional details of the engine 106 and associated components are illustrated. The engine 106 receives intake air for combustion from an intake, such as an intake manifold 115. The intake may be any suitable conduit or conduits through which gases flow to enter the engine. For example, the intake may include the intake manifold 115, the intake passage 136, and the like. The intake passage 136 receives ambient air from an air filter (not shown) that filters air from outside of a vehicle in which the engine 106 may be positioned. Exhaust gas resulting from combustion in the engine 106 is supplied to an exhaust, such as exhaust passage 113. The exhaust may be any suitable conduit through which gases flow from the engine. For example, the exhaust may include an exhaust manifold 117, the exhaust passage 113, and the like. Exhaust gas flows through the exhaust passage 113, and out of an exhaust stack of the rail vehicle. In one example, the engine 106 is a diesel engine that combusts air and diesel fuel through compression ignition. In other non-limiting embodiments, the engine 106 may combust fuel including gasoline, kerosene, biodiesel, or other petroleum distillates of similar density through compression ignition (and/or spark ignition).

In the embodiment depicted in FIG. 2, the engine 106 is a V-12 engine having twelve cylinders. In other examples, the engine may be a V-6, V-8, V-10, V-16, I-4, I-6, I-8, opposed 4, or another engine type. As depicted, the engine 106 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 2, the non-donor cylinders 105 are coupled to the exhaust passage 113 to route exhaust gas from the engine to atmosphere (after it passes through an exhaust gas treatment system 130 and first and second turbochargers 120 and 124). The donor cylinders 107, which provide engine exhaust gas recirculation (EGR), are coupled exclusively to an EGR passage 162 of an EGR system 160 which routes exhaust gas from the donor cylinders 107 to the intake passage 136 of the engine 106, and not to atmosphere. By introducing cooled exhaust gas to the engine 106, the amount of available oxygen for combustion is decreased, thereby reducing combustion flame temperatures and reducing the formation of nitrogen oxides (e.g., $NO_x$).

Exhaust gas flowing from the donor cylinders 107 to the intake passage 136 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. In such an example, one or more charge air coolers 132 and 134 disposed in the intake passage 136 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 136.

Additionally, in some embodiments, the EGR system 160 may include an EGR bypass passage 161 that is configured to divert exhaust from the donor cylinders back to the exhaust passage. The EGR bypass passage 161 may be controlled via a valve 163. The valve 163 may be configured with a plurality of restriction points such that a variable amount of exhaust is routed to the exhaust, in order to provide a variable amount of EGR to the intake.

In an alternate embodiment shown in FIG. 2, the donor cylinders 107 may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler 166 and/or additional elements prior to being routed to the intake passage 136. Further, the alternate EGR system includes a first valve 164 disposed between the exhaust passage 116 and the alternate EGR passage 165.

The first valve 164 and second valve 170 may be on/off valves controlled by the control unit 180 (for turning the flow of EGR on or off), or they may control a variable amount of EGR, for example. In some examples, the first valve 164 may be actuated such that an EGR amount is reduced (exhaust gas flows from the EGR passage 165 to the exhaust passage 113). In other examples, the first valve 164 may be actuated such that the EGR amount is increased (e.g., exhaust gas flows from the exhaust passage 113 to the EGR passage 165). In some embodiments, the alternate EGR system may include a plurality of EGR valves or other flow control elements to control the amount of EGR.

In such a configuration, the first valve 164 is operable to route exhaust from the donor cylinders to the exhaust passage 116 of the engine 106 and the second valve 170 is operable to route exhaust from the donor cylinders to the intake passage 136 of the engine 106. As such, the first valve 164 may be referred to as an EGR bypass valve, while the second valve 170 may be referred to as an EGR metering valve. In the embodiment shown in FIG. 1, the first valve 164 and the second valve 170 may be engine oil, or hydraulically, actuated valves, for example, with a shuttle valve (not shown) to modulate the engine oil. In some examples, the valves may be actuated such that one of the first and second valves 164 and 170 is normally open and the other is normally closed. In other examples, the first and second valves 164 and 170 may be pneumatic valves, electric valves, or another suitable valve.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust passage 113 to a location downstream of turbochargers 120 and 124 in the intake passage 136. In other embodiments, the rail vehicle 100 may additionally or alternatively include a low-pressure EGR system which routes exhaust gas from downstream of the turbochargers 120 and 124 in the exhaust passage 116 to a location upstream of the turbochargers 120 and 124 in the intake passage 136.

As depicted in FIG. 2, the rail vehicle 100 further includes a two-stage turbocharger with the first turbocharger 120 and the second turbocharger 124 arranged in series, each of the turbochargers 120 and 124 arranged between the intake passage 136 and the exhaust passage 116. The two-stage turbocharger increases air charge of ambient air drawn into the intake passage 136 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The first turbocharger may be referred to the "low-pressure stage" of the turbocharger. The second turbocharger 124 operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 2, the second turbocharger 124 is provided with a turbine bypass valve 128 which allows exhaust gas to bypass the second turbocharger 124. The turbine bypass valve 128 may be opened, for example, to divert the exhaust gas flow away from the second turbine 125. In this manner, the rotating speed of the compressor 126, and thus the boost provided by the turbochargers 120, 124 to the engine 106 may be regulated during steady state conditions. Additionally, the first turbocharger 120 may also be provided with a turbine bypass valve. In other embodiments, only the first turbocharger 120 may be provided with a turbine bypass valve, or only the second turbocharger 124 may be provided with a turbine bypass valve. Additionally, the second turbocharger may be provided with a compressor bypass valve 129, which allows gas to bypass the second compressor 126 to avoid compressor surge, for example. In some embodiments, first turbocharger 120 may also be provided with a compressor bypass valve, while in other embodiments, only first turbocharger 120 may be provided with a compressor bypass valve.

The rail vehicle 100 further includes an exhaust treatment system 130 coupled in the exhaust passage in order to reduce regulated emissions. As depicted in FIG. 2, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The rail vehicle 100 further includes the control unit 180, which is provided and configured to control various components related to the rail vehicle 100. In one example, the control unit 180 includes a computer control system. The control unit 180 further includes non-transitory, computer readable storage media (not shown) including code for enabling on-board monitoring and control of engine operation. The control unit 180, while overseeing control and management of the rail vehicle 100, may be configured to receive signals from a variety of engine sensors, as further elaborated herein, in order to determine operating parameters and operating conditions, and correspondingly adjust various engine actuators to control operation of the rail vehicle 100. For example, the control unit 180 may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, etc. Correspondingly, the control unit 180 may control the rail vehicle 100 by sending commands to various components such as fraction motors, alternator, cylinder valves, throttle, heat exchangers, wastegates or other valves or flow control elements, etc.

Further, in some embodiments, cooling may be provided to one or more engine exhaust passage valves via compressed air. The engine exhaust passage valves may include valves exposed to high heat within the exhaust passage, including first EGR valve 164, second EGR valve 170, and turbine bypass valve 128. Compressed air may be directed onto an exterior of each valve via respective air jets (not shown in FIG. 2). The air jets may be provided with compressed air from air compressor 116 via compressed air line 190 and/or from the outlet of high-pressure compressor 126 via compressed air line 192. An air control valve 191 may be present in compressed air line 190 to control the timing and amount of air introduced to the exhaust passage valves. Similarly, an air control valve 193 may be present in compressed air line 192. The air control valves may be controlled by controller 180. While not shown in FIG. 2, each air jet that supplies air to an engine exhaust passage valve may have a separate compressed air line, and the air supplied to each air jet may be controlled by individual air control valves.

In this way, compressed air from a turbocharger compressor outlet or from a vehicle air compression system (or other air compression system) may be used to cool one or more engine components. The compressed air may be expanded to cool components at or near the point of expansion. As described above, the compressed air may be provided to one or more air jets. Upon exiting the air jet, the compressed air may expand to cool a downstream component. While FIG. 2 illustrates cooling of one or more engine exhaust passage valves, other engine components may also be cooled by the compressed air. Such components may include exhaust passage sensors, such as sensors 181, 182, 183, and 184, turbocharger components, aftertreatment devices, and other components.

Thus, in some embodiments, a portion of the compressed air from a turbocharger compressor outlet may be directed through a side passage branching off from the outlet of the compressor, and to an air jet. The air jet may be configured to cool an engine component by expanding the compressed air.

Figure 3:
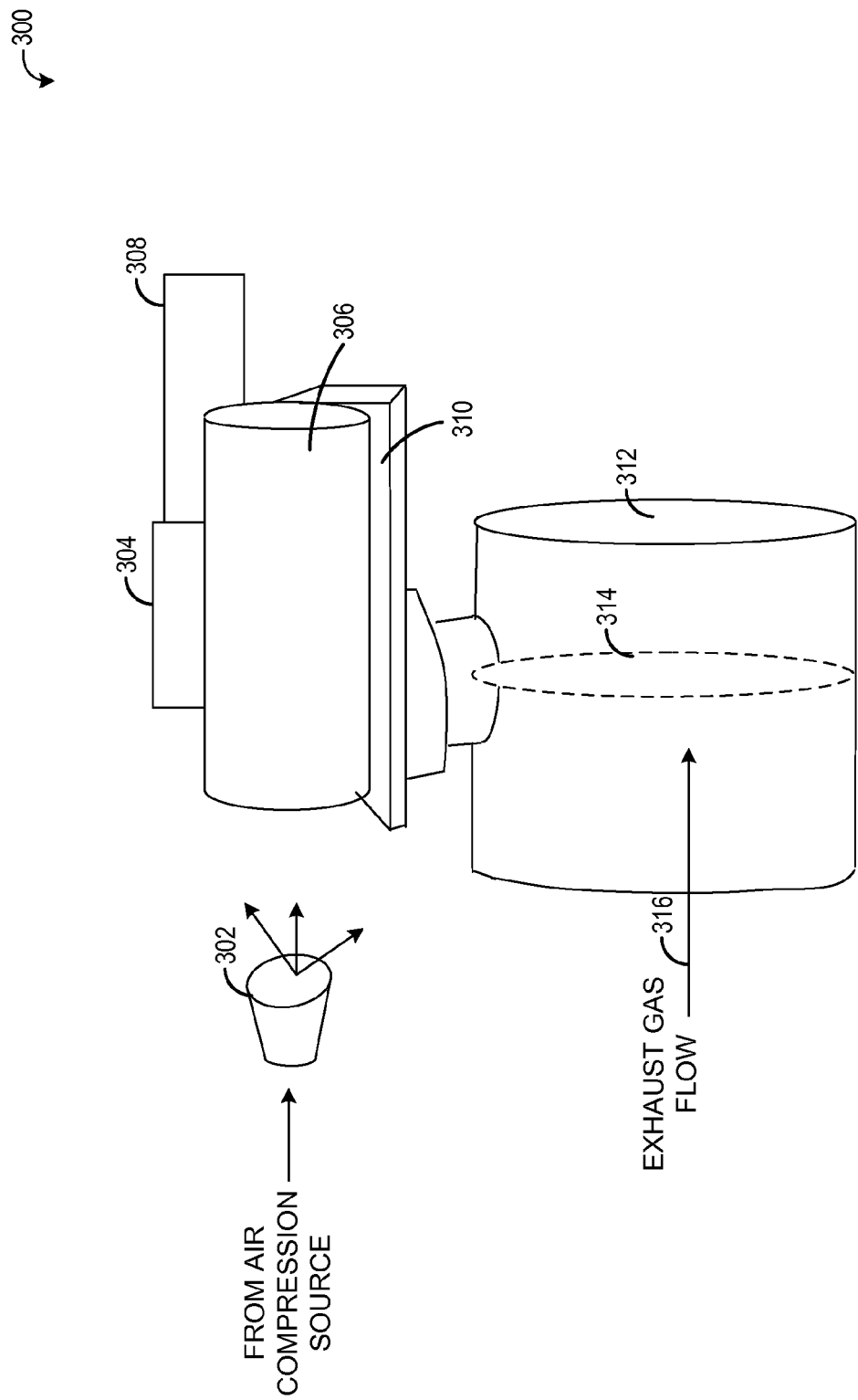
FIG. 3 shows an example of an exhaust passage valve.

FIG. 3 illustrates an example of an engine exhaust passage valve 300 that may be cooled via an air jet 302. As explained above, the exhaust passage valve 300 may be a suitable valve in the engine exhaust system that is exposed to high-temperature exhaust, such as an EGR valve (e.g., valve 163, 164, and/or valve 170) or turbine bypass valve (e.g., valve 128). The exhaust passage valve is located downstream of the engine in a passage configured to flow exhaust gas. As such, it is separate from and located downstream of the cylinder exhaust valves.

Exhaust passage valve 300 is illustrated in FIG. 3 as an oil control valve. Oil is provided to the valve via oil line fittings 304. The oil is used in actuator 306 to adjust the position of butterfly plate 314, which is located in casing 312. Casing 312 may be fitted in an exhaust passage, for example. Further, the position of exhaust passage valve 300 is determined from position sensor 308, and the components of the valve head (the oil fittings 304, actuator 306, and position sensor 308) are protected from exhaust heat via heat shield 310. However, under some conditions, such as when the vehicle in which the exhaust passage valve is installed enters a tunnel, the exhaust gas may reach such high temperatures that the heat shield does not adequately protect the valve components from the high temperatures.

To cool the valve, air jet 302 is located in a position to direct air over the exterior of exhaust passage valve 300. As shown in FIG. 3, air jet 302 is located proximate to the head of the valve, and may direct air onto the surface of actuator 306 prior to reaching position sensor 308. Further, air jet 302 may be configured to direct air onto the surface of valve 300 in a direction parallel to the flow of exhaust gas 316 through the valve. The air jet 302 is provided with compressed air from an air compression source, such as the air compression system compressor (e.g., compressor 116) or from a turbocharger compressor (e.g., compressor 126). The compressed air may be at or near ambient temperature, and thus may effectively cool the surfaces of the valve components.

While FIG. 3 illustrates an air jet configured to direct air onto the exterior an exhaust passage valve actuator prior to reaching a position sensor in a direction parallel to a flow of exhaust, other configurations are possible. For example, the air jet may be located in a different position relative to the valve components, such as proximate the position sensor. The air jet may also be positioned to direct air onto the valve in a direction perpendicular to the flow of exhaust gas.

Figure 4:
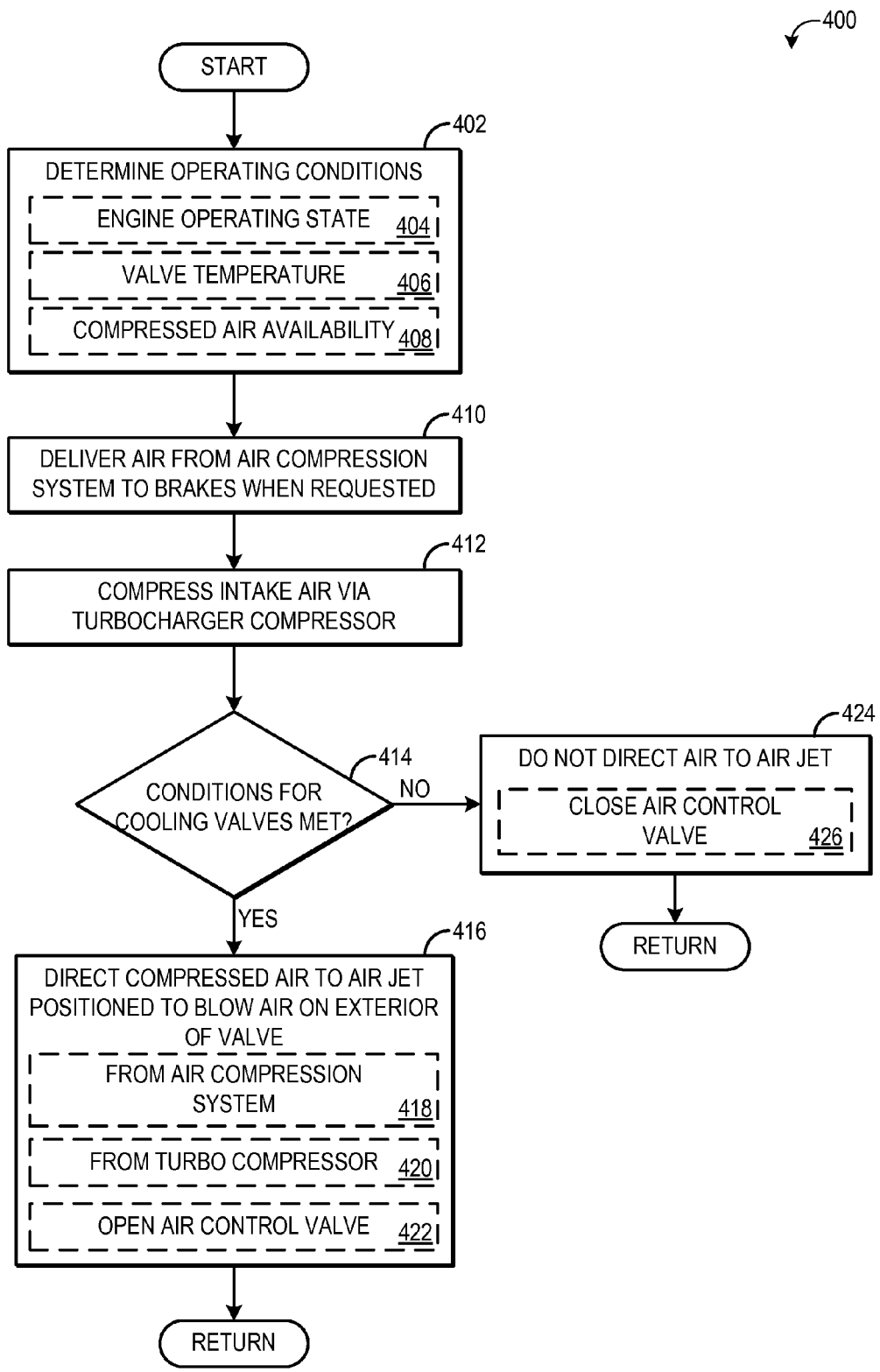
FIG. 4 illustrates a method for cooling an exhaust passage valve according to an embodiment of the invention.

Turning now to FIG. 4, a method 400 for cooling an exhaust passage valve with compressed air is presented. Method 400 may be carried out by controller 180 according to instructions stored thereon. Method 400 comprises, at 402, determining operating conditions. The operating conditions may include engine speed, engine load, mass air flow, exhaust temperature (measured or modeled), and other parameters. Further, as indicated at 404, the operating parameters may include the engine operating state. The engine operating state may include determining if the engine is operating or not operating. Additionally, if the engine is operating, the engine operating state may include determining if the engine is operating in idle or in a higher notched gear.

The operating conditions may include determining the temperature of one or more engine exhaust passage valves at 406. As explained previously, the exhaust passage valves may include EGR valves and/or turbine bypass valves. The temperature of the valves may be estimated based on exhaust temperature and mass air flow, for example. Additionally, at 408, the operating conditions may include determining the availability of compressed air. Compressed air may be provided via a compressed air system that generates and stores compressed air for various uses in the vehicle, such as actuating the vehicle brakes. In another example, the compressed air may be provided from a turbocharger compressor.

The availability of the compressed air may depend on the operating conditions of the vehicle and the source of the compressed air. For example, the compressed air from the air compression system may only be available during engine operation. When the engine is shut off, the stored compressed air may be used for a variety of vehicle components. When the air is depleted, the engine is restarted to generate more compressed air. To reduce depletion of the stored air, the compressed air may be unavailable to cool the valves when the engine is off. Similarly, if the engine is in idle, the compressed air may not be available. If the air is provided by a turbocharger compressor, engine conditions may determine if compressed air is available. For example, if the turbocharger is in a surge condition, where a pressure difference across the compressor is high and mass flow through the compressor is low, air flow through the compressor may reverse direction. To alleviate surge, intake air may bypass the compressor. As a result, compressed air may not be available. Additionally, the availability of turbocharger compressed air may be based on engine air flow needs (e.g., air fuel ratio) or other parameters.

At 410, method 400 includes delivering compressed air from the compressed air system to the vehicle brakes in response to a vehicle braking request. At 412, method 400 includes compressing engine intake air via the turbocharger compressor. At 414, method 400 includes determining if conditions have been met for cooling an exhaust passage valve. The conditions for cooling the valve may include the temperature of the valve. For example, if the valve temperature is above a threshold temperature, such as 150° C., then it may be indicated that the valve is to be cooled. The conditions for cooling the valve also include the availability of the compressed air. For example, as described above, the compressed air may not be available if the engine is off or in idle, if the turbocharger compressor is in a surge condition, etc.

If it is determined that the conditions for cooling the valve have been met, method 400 proceeds to 416 to directed compressed air to an air jet positioned to provide air to an exterior of the exhaust passage valve. The compressed air may provided from an air compression system, as indicated at 418. Additionally or alternatively, the compressed air may be provided from the engine intake air downstream of a turbocharger compressor, as indicated at 420. To provide the compressed air, an air control valve may be opened at 422. The air control valve may regulate the amount of compressed air provided to the air jet. Each air jet may be provided air via a separate air control valve. Further, each air jet may be configured to provide differing levels of cooling. For example, an air jet positioned to cool an EGR metering valve (e.g., valve 164) may provide a larger amount of cooling than an air jet positioned to cool an EGR bypass valve (e.g., valve 170), which may be configured to provide a larger amount of cooling than an air jet positioned to cool a turbine bypass valve (e.g., valve 128). To provide the differing levels of cooling, each air jet may be of different size (for example, each air jet may have different sized nozzles). In other examples, each air control valve may be opened by a different amount to provide different amounts of cooling air.

Returning to 414, it is determined that conditions for cooling the exhaust passage valve have not been met, method 400 proceeds to 424 to not direct air to an air jet positioned to cool the valve. Instead, the compressed air may continue to be delivered to the vehicle brakes and/or engine. Not directing air to the air jet may include closing an air control valve at 426. Method 400 then returns.

An embodiment relates to a method comprising directing compressed air onto an exterior of an engine exhaust passage valve. The directing compressed air may comprise routing intake air from downstream of a turbocharger compressor to an air jet positioned to provide the intake air to the exterior of the engine exhaust passage valve. The method may include adjusting an air control valve downstream of the compressor to route the intake air to the air jet. The air control valve may be adjusted responsive to a temperature of the engine exhaust passage valve. The directing compressed air may comprise routing air from a compressed air system to an air jet positioned to provide the air to the exterior of the engine exhaust passage valve. The method may further comprise adjusting an air control valve downstream of the compressed air system to route the air to the air jet.

The air control valve may be adjusted responsive to a temperature of the engine exhaust passage valve. In another example, the air control valve may be adjusted responsive to an engine operating condition (e.g., vehicle operation in a tunnel, engine on condition, etc.). The engine exhaust passage valve may be actuated by an oil control valve. The engine exhaust passage valve may be an exhaust gas recirculation valve and/or a turbine bypass valve.

Another embodiment relates to a method comprising directing air from a compressed air system to vehicle air brakes responsive to a braking request, and during select operating conditions, directing air from the compressed air system onto an exterior of an engine exhaust passage valve. The select operating conditions may comprise a temperature of the engine exhaust passage valve being above a threshold temperature. In another example, the select operating conditions comprise engine operation. The directing air on the exterior of the engine exhaust passage valve may comprise directing air from an air jet to the exterior of the engine exhaust passage valve in a direction parallel to a flow of exhaust through the engine exhaust passage valve.

A further embodiment relates to a system comprising an engine having an engine exhaust passage and an engine exhaust passage valve, and a first air jet configured to direct compressed air onto an exterior of the engine exhaust passage valve. The system may further comprise a turbocharger including a turbine and a compressor, air flow through the turbine controlled by a turbine bypass valve, and an exhaust gas recirculation (EGR) system configured to selectively route exhaust from a subset of cylinders of the engine to an intake of the engine via an EGR metering valve and to atmosphere (via turbomachinery in some examples) via an EGR bypass valve. The first air jet may be configured to direct compressed air onto an exterior of the EGR metering valve, a second air jet may be configured to direct compressed air onto an exterior of the EGR bypass valve, and a third air jet may be configured to direct compressed air onto an exterior of the turbine bypass valve.

The compressed air provided to the first, second, and third air jets may be routed from downstream of the compressor, and the first air jet may be configured to direct a larger amount of compressed air than the second and third air jets. The EGR metering valve may comprise an oil control valve, and the first air jet may be positioned to direct the compressed air on an actuator of the EGR metering valve in a direction parallel to a flow of exhaust through the EGR metering valve. The turbocharger may be a high-pressure turbocharger, the system may further comprise a low-pressure turbocharger, and the compressed air provided to the first, second, and third air jets may be routed from downstream of the compressor of the high-pressure turbocharger.

Figure 5:
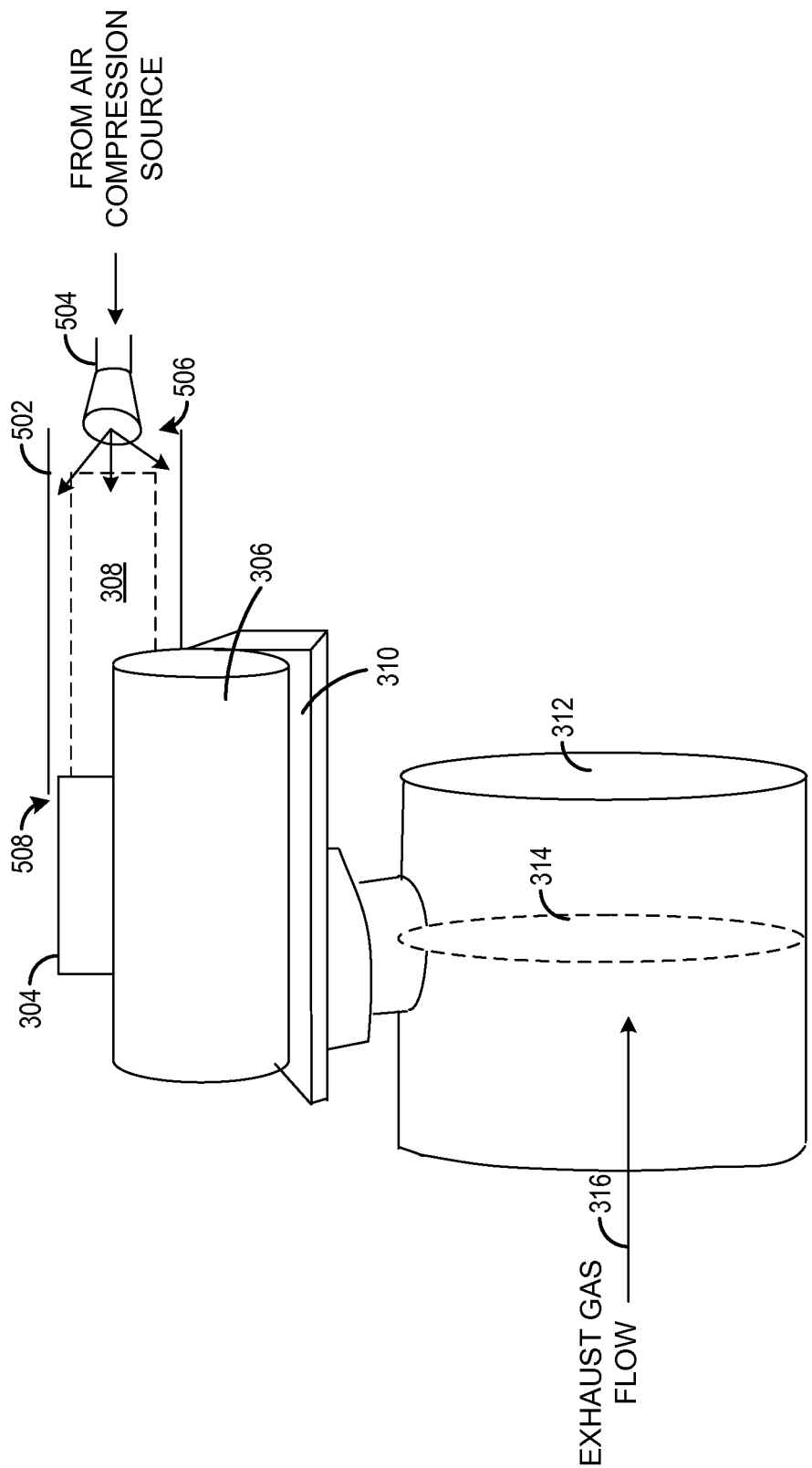
FIGS. 5-7 show an example of an exhaust passage valve according to another embodiment of the invention.
Figure 6:
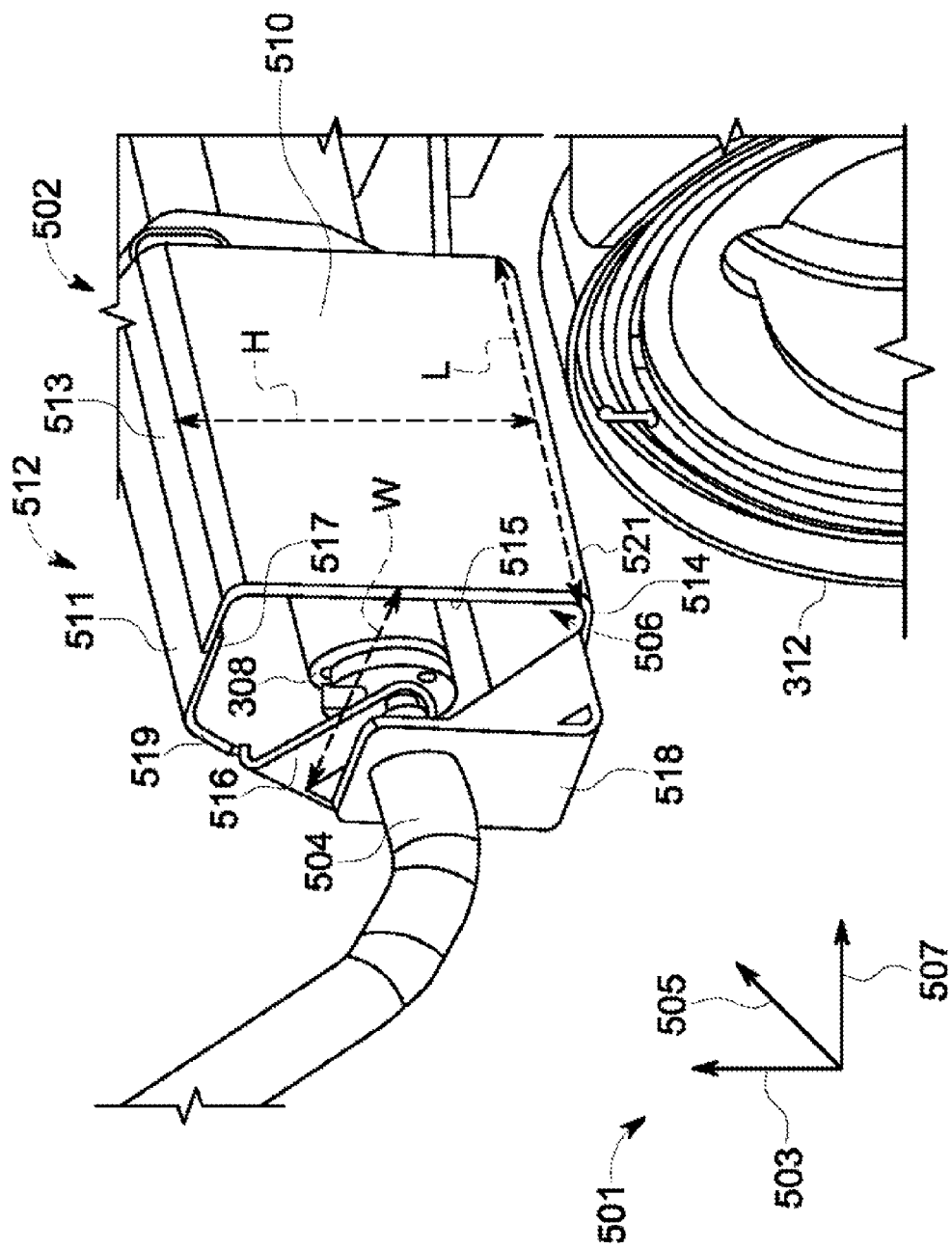
Figure 7:
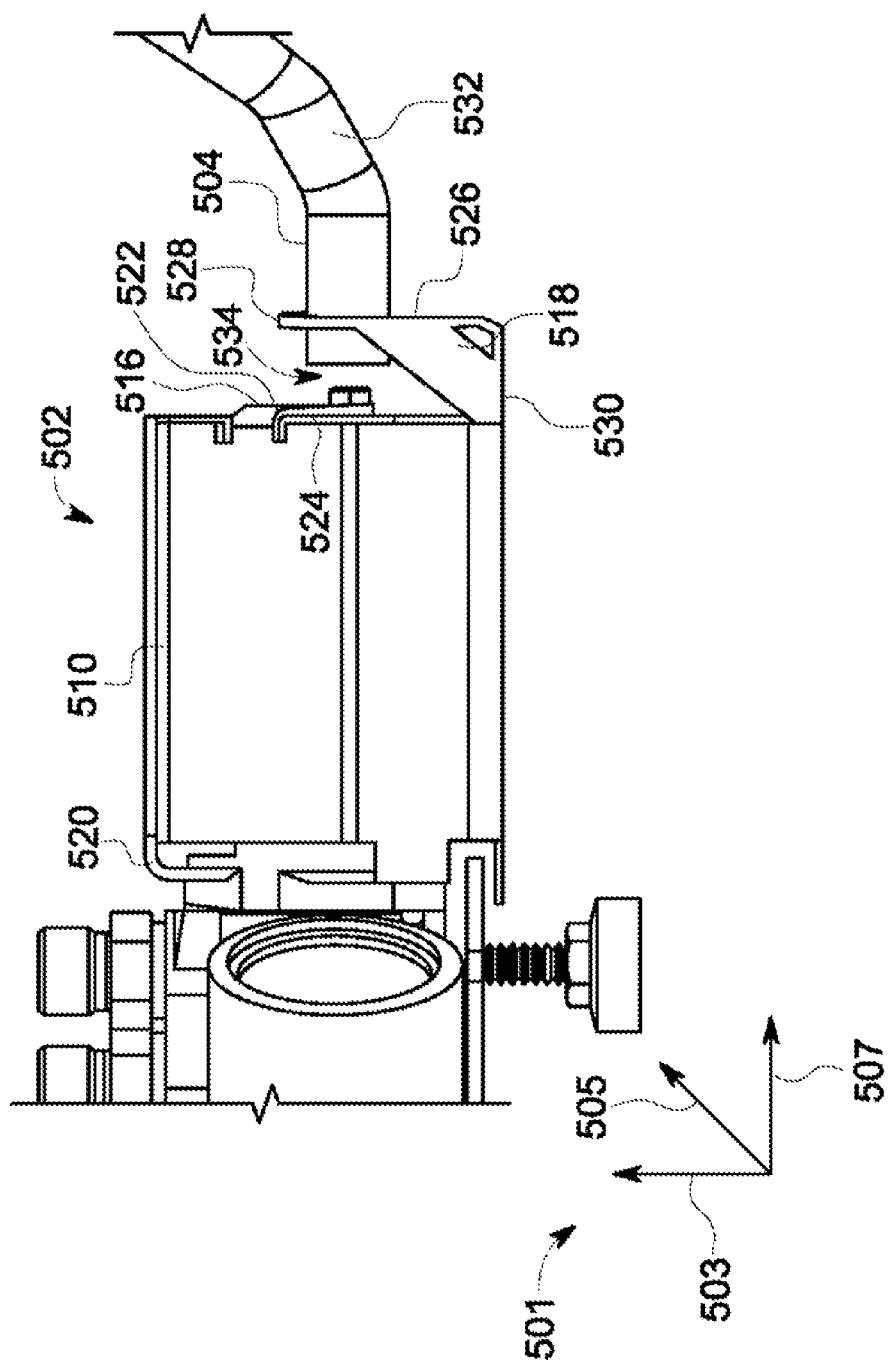

FIGS. 5-7 illustrate another embodiment of an engine exhaust passage valve 500 that may be cooled via an air jet 504. Similar to exhaust passage valve 300 of FIG. 3, the exhaust passage valve 500 may be a suitable valve in the engine exhaust system that is exposed to high-temperature exhaust, such as an EGR valve (e.g., valve 163, 164, and/or valve 170) or a turbine bypass valve (e.g., valve 128). The exhaust passage valve is located downstream of the engine in a passage configured to flow exhaust gas. As such, it is separate from and located downstream of the cylinder exhaust valves. Components of FIGS. 5-7 introduced in FIG. 3 are similarly numbered and not reintroduced. FIGS. 6 and 7 include a coordinate axis 501 with a vertical axis 503, a lateral axis 505, and a horizontal axis 507.

In addition to heat shield 310, which as described above protects components of the valve head from exhaust heat, an additional heat shield 502 is present in engine exhaust passage valve 500. Heat shield 502 may substantially surround position sensor 308. As such, to differentiate the heat shields, heat shield 310 may be referred to as a valve head heat shield, while heat shield 502 may be referred to as a position sensor heat shield.

Position sensor heat shield 502 may comprise a hollow structure that substantially surrounds position sensor 308. Heat shield 502 includes a length L that extends along lateral axis 505, a height H that extends along vertical axis 503, and a width W that extends along horizontal axis 507. Heat shield 502 may be comprised of a bent metal member 510 having a suitable thickness. (As used herein, "member" includes a single piece or multiple pieces coupled together.) In some embodiments, the thickness of the bent metal member 510 (and thus the thickness of the walls of the heat shield 502) may be relatively large, while in other embodiments the thickness of the bent metal member 510 may be relatively small (e.g., thin). The length, height, and width of the heat shield 502 may have suitable proportions relative to each other. As illustrated, heat shield 502 is substantially rectangular, with a length that is larger than the height and width of the heat shield. The shape of the heat shield may provide maximal heat shielding of the length of the position sensor while requiring minimal packaging space. However, in some embodiments the heat shield may be square, have a length that is shorter than a width or height, or be of a different shape, such as a hexagon, octagon, rounded, etc.

Heat shield 502 may include an overlap region 512 where two ends of the metal member (e.g., top end 511 and bottom end 513) overlap, forming a hollow structure having a first open end 506 and a second open end 508, thus allowing air within heat shield 502 to surround position sensor 308. As such, position sensor 308 is housed within heat shield 502. In this way, heat shield 502 may at least partially cover an exterior of position sensor 308, and in some embodiments may substantially surround position sensor 308. In some embodiments, top end 511 and bottom end 513 may not overlap and instead may be continuous. Top end 511 and bottom end 513 may be welded together, fastened with bolts and/or screws, or otherwise coupled together.

While position sensor heat shield 502 may act to reduce heat radiated to the position sensor 308 and other components of engine exhaust passage valve 500, in some conditions additional cooling of the valve may be needed. To cool the valve, air jet 504 is coupled to heat shield 502 and configured to direct air over the exterior of exhaust passage valve 500 by routing air into heat shield 502. Heat shield 502 includes a plurality of interior walls that face into the hollow central region of heat shield 502 and are configured to at least partially contain air around position sensor 308. Thus, each interior wall may be spaced apart from and not touching position sensor 308. Heat shield 502 includes a first interior wall 514, second interior wall 515, third interior wall 517, and fourth interior wall 519. First interior wall 514 is opposite third interior wall 517 and adjacent to second interior wall 515 and fourth interior wall 519. Likewise, second interior wall 515 is opposite fourth interior wall 519. Further, third interior wall 517 comprises overlap region 512.

Each interior wall may have a corresponding exterior wall in face-sharing contact that face away from the interior of heat shield 502. For example, exterior wall 521 may be in face-sharing contact with first interior wall 514. Exterior wall 521 may be proximate to casing 312 and/or butterfly plate 314. As such, the plurality of interior walls may be continuous (e.g., comprised of a single piece of material) except at overlap region 512. Likewise, the exterior walls may also be continuous other than in overlap region 512. However, in some embodiments, one or more of the interior and exterior walls may be comprised of separate pieces coupled together. Further, as stated above, in some embodiments, there may be no overlap region and all the interior and exterior walls may be continuous. The heat shield includes a plurality of corners where each interior/exterior wall is contact with an adjacent interior/exterior wall. As shown, these corners may be rounded. In other embodiments, the corners may be square, chamfered, or another suitable shape.

In some embodiments, each interior wall may be substantially flat. However, in other embodiments, one or more of the interior walls may be curved, bent, etc. For example, fourth interior wall 519 may include a bend such that one of the corners of the heat shield (e.g., where fourth interior wall 519 and third interior wall 517 contact each other) is chamfered.

As shown in FIGS. 6-7, air jet 504 is coupled to heat shield 502 via an extended bracket 518. Air from air jet 504 may be directed through open end 506 of heat shield 502, contacting the plurality of interior walls, pass over an exterior of position sensor 308 and/or additional components of engine exhaust passage valve 500, and be directed out of heat shield 502 via second open end 508.

Further, air jet 504 may be configured to direct air onto the surface of valve 500 in a direction parallel to the flow of exhaust gas 316 through the valve (e.g., along lateral axis 505). The air jet 504 is provided with compressed air from an air compression source via an air pipe 532, such as the air compression system compressor (e.g., compressor 116) or from a turbocharger compressor (e.g., compressor 126). The compressed air may be at or near ambient temperature, and thus may effectively cool the surfaces of the valve components.

While FIGS. 5-7 illustrate an air jet configured to direct air onto the exterior of an exhaust passage valve position sensor prior to reaching the remaining valve components (e.g., valve actuator) in a direction parallel to a flow of exhaust, other configurations are possible. For example, the air jet may be located in a different position relative to the valve components, such as proximate the actuator. The air jet may also be positioned to direct air onto the valve in a direction perpendicular to the flow of exhaust gas.

Further, heat shield 502 may be coupled to engine exhaust passage valve 500 at one or more coupling points. As shown in FIGS. 6-7, heat shield 502 may be coupled to position sensor 308 via a first bracket 516. First bracket 516 may be coupled to position sensor 308 via a mounting device such as a screw, bolt, etc. First bracket 516 may be in contact with or otherwise coupled to fourth interior wall 519 and/or its corresponding exterior wall. First bracket 516 may be a suitable shape, such as triangular, square, rectangular, etc. In one example, one end of first bracket 516 may be wider than another, opposite end.

Further, heat shield 502 may be coupled to another component of engine exhaust passage valve 500, such as oil line fitting 304, via a second bracket 520. Second bracket 520 may be in contact with or otherwise coupled to third interior wall 517 and/or its corresponding exterior wall, at or near overlap region 512. First bracket 516 may include a first side 522 facing away from heat shield 502 and a second side 524 facing towards heat shield 502. Second side 524 may be in contact with position sensor 308.

Heat shield 502 may be coupled to air jet 504 via extended bracket 518, which includes a first side 526 facing away from heat shield 502 and a second side 528 facing towards heat shield 502 and opposite first side 522 of first bracket 516. A third side 530 of extended bracket 518, perpendicular to the first and second sides 526, 530, may provide a gap 534 between air jet 504 and first open end 506 of heat shield 502. This may provide space for air routed from air jet 504 to flow into heat shield 502 and over position sensor 308.

Thus, heat shield 502 may be positioned to decrease heat radiated to an engine exhaust passage valve while providing a path for compressed air to travel around the engine exhaust passage valve. As such, the heat shield may be positioned locally around at least a portion of the engine exhaust passage valve (e.g., positioned within a threshold distance of the engine exhaust passage valve, such as within 1 cm, 5 cm, or other suitable distance). Further, the compressed air directed through the heat shield may be provided at a pressure greater than ambient pressure.

Figure 8:
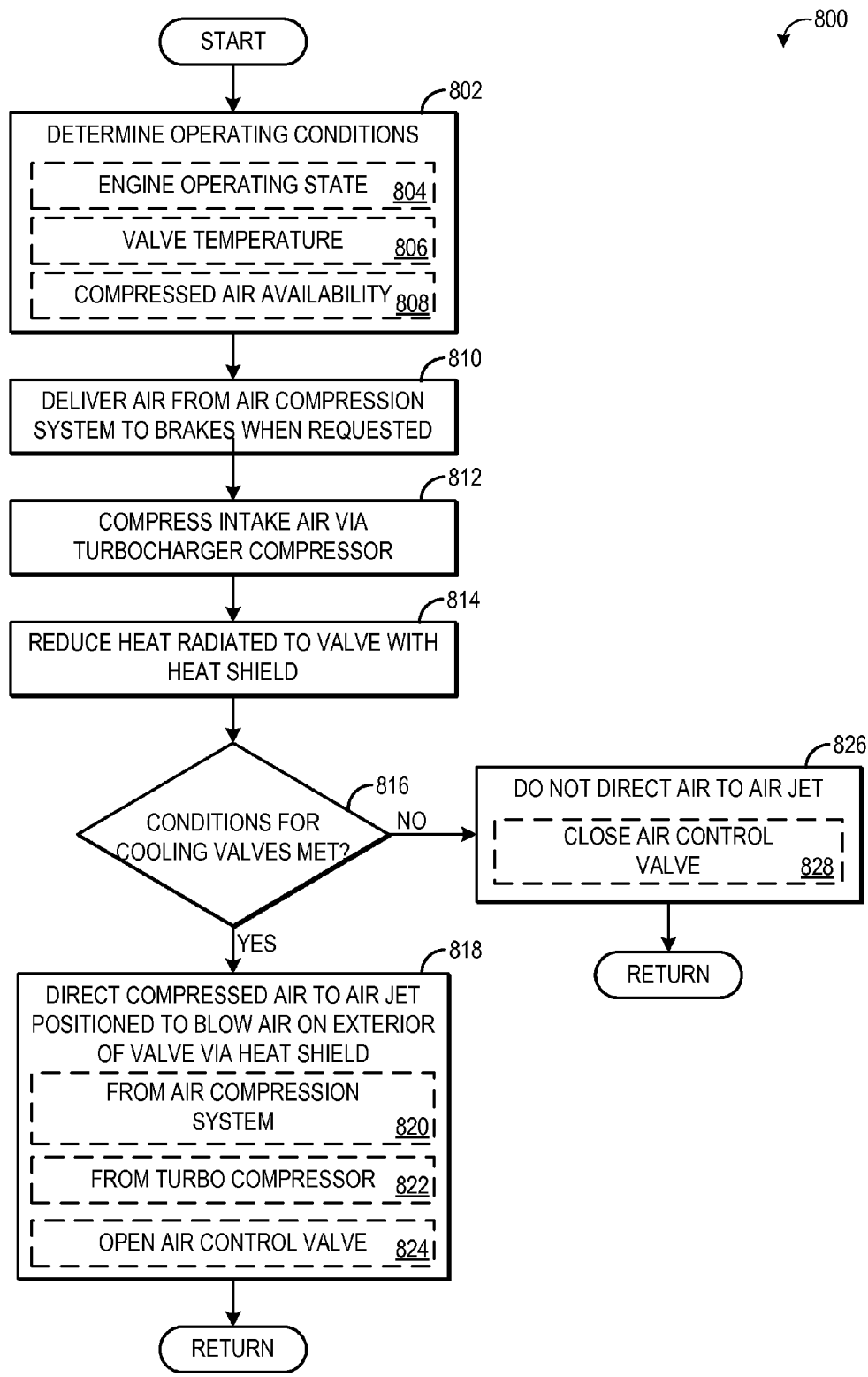
FIG. 8 illustrates a method for cooling an exhaust passage valve according to another embodiment of the invention.

Turning now to FIG. 8, a method 800 for cooling an exhaust passage valve with compressed air directed into a heat shield is presented. Method 800 may be carried out by controller 180 according to instructions stored thereon. Method 800 comprises, at 802, determining operating conditions. The operating conditions may include engine speed, engine load, mass air flow, exhaust temperature (measured or modeled), and other parameters. Further, as indicated at 804, the operating parameters may include the engine operating state. The engine operating state may include determining if the engine is operating or not operating. Additionally, if the engine is operating, the engine operating state may include determining if the engine is operating in idle or in a higher notched gear.

The operating conditions may include determining the temperature of one or more engine exhaust passage valves at 806. As explained previously, the exhaust passage valves may include EGR valves and/or turbine bypass valves. The temperature of the valves may be estimated based on exhaust temperature and mass air flow, for example. Additionally, at 808, the operating conditions may include determining the availability of compressed air. Compressed air may be provided via a compressed air system that generates and stores compressed air for various uses in the vehicle, such as actuating the vehicle brakes. In another example, the compressed air may be provided from a turbocharger compressor.

The availability of the compressed air may depend on the operating conditions of the vehicle and the source of the compressed air, as explained above with respect to FIG. 4. For example, the compressed air from the air compression system may only be available during engine operation. In another example, if the turbocharger is in a surge condition, compressed air from the turbocharger may not be available. Additionally, the availability of turbocharger compressed air may be based on engine air flow needs (e.g., air fuel ratio) or other parameters.

At 810, method 800 includes delivering compressed air from the compressed air system to the vehicle brakes in response to a vehicle braking request. At 812, method 800 includes compressing engine intake air via the turbocharger compressor. At 814, method 800 includes reducing heat radiated to the engine exhaust passage valve with a heat shield coupled to the engine exhaust passage valve. For example, a heat shield, such as heat shield 502, may at least partially cover an exterior of the engine exhaust passage valve (e.g., the heat shield may substantially surround the position sensor of the valve) and block and/or insulate the engine exhaust passage valve from heat radiated from the engine exhaust, for example.

At 816, method 800 includes determining if conditions have been met for cooling an exhaust passage valve. The conditions for cooling the valve may include the temperature of the valve. For example, if the valve temperature is above a threshold temperature, such as 150° C., then it may be indicated that the valve is to be cooled. If the temperature of the engine exhaust passage valve is estimated based on operating conditions, such as exhaust temperature, engine temperature, engine speed and/or engine load, the threshold valve temperature that the valve may reach before being cooled by the compressed air may be greater for the valve including a position sensor heat shield (such as valve 500) than for a valve not including a position sensor heat shield (such as valve 300). That is, when a position sensor heat shield is present, the exhaust temperature tolerated by the valve before compressed air is used to cool the valve may be greater than when a position sensor heat shield is not present.

The conditions for cooling the valve also include the availability of the compressed air. For example, as described above, the compressed air may not be available if the engine is off or in idle, if the turbocharger compressor is in a surge condition, etc.

If it is determined that the conditions for cooling the valve have been met, method 800 proceeds to 818 to direct compressed air to an air jet configured to route air over the exhaust passage valve by directing air into the heat shield. The compressed air may be provided from an air compression system, as indicated at 820. Additionally or alternatively, the compressed air may be provided from the engine intake air downstream of a turbocharger compressor, as indicated at 822. To provide the compressed air, an air control valve may be opened at 824. The air control valve may regulate the amount of compressed air provided to the air jet. Each air jet may be provided air via a separate air control valve. Further, each air jet may be configured to provide differing levels of cooling. For example, an air jet positioned to cool an EGR metering valve (e.g., valve 164) may provide a larger amount of cooling than an air jet positioned to cool an EGR bypass valve (e.g., valve 170), which may be configured to provide a larger amount of cooling than an air jet positioned to cool a turbine bypass valve (e.g., valve 128). To provide the differing levels of cooling, each air jet may be of different size (for example, each air jet may have different sized nozzles). In other examples, each air control valve may be opened by a different amount to provide different amounts of cooling air.

Returning to 816, if it is determined that conditions for cooling the exhaust passage valve have not been met, method 800 proceeds to 826 to not direct air to an air jet positioned to cool the valve. Instead, the compressed air may continue to be delivered to the vehicle brakes and/or engine. Not directing air to the air jet may include closing an air control valve at 828. Method 800 then returns.

Thus, the systems and methods described herein provide for a method comprising directing compressed air onto an exterior of an engine exhaust passage valve, the compressed air at least partially contained around the engine exhaust passage valve by a heat shield.

The compressed air may be routed into a first open end of the heat shield and around the engine exhaust passage valve. The compressed air may be contained around the heat shield by a plurality of interior walls of the heat shield.

The heat shield may at least partially cover an exterior of a position sensor of the engine exhaust passage valve, and the compressed air may be routed into the heat shield and around the position sensor.

In an example, intake air from downstream of a turbocharger compressor may be routed to an air jet positioned to provide the intake air into the heat shield. An air control valve downstream of the compressor may be adjusted to route the intake air to the air jet responsive to a temperature of the engine exhaust passage valve.

In an example, air from a compressed air system may be routed to an air jet positioned to provide the air into the heat shield. An air control valve downstream of the compressed air system may be adjusted to route the air to the air jet. The air control valve may be adjusted responsive to one or more of a temperature of the engine exhaust passage valve or an engine operating condition.

The engine exhaust passage valve may be an oil control valve, an exhaust gas recirculation valve, or a turbine bypass valve.

Another embodiment includes a method comprising reducing heat radiated to an engine exhaust passage valve with a heat shield at least partially covering an exterior of the engine exhaust passage valve, directing air from a compressed air system to vehicle air brakes responsive to a braking request, and during select operating conditions, directing air from the compressed air system onto the exterior of the engine exhaust passage valve by directing the air into the heat shield.

The select operating conditions may comprise a temperature of the engine exhaust passage valve being above a threshold temperature and/or may comprise engine operation.

In one example, air from an air jet may be directed to an open end of the heat shield and over the exterior of the engine exhaust passage valve in a direction parallel to a flow of exhaust through the engine exhaust passage valve.

A system comprises a heat shield surrounding at least part of an engine exhaust passage valve positioned in an engine exhaust passage of an engine; and an air jet configured to direct compressed air into the heat shield, the heat shield configured to at least partially contain the compressed air around an exterior of at least the part of the engine exhaust passage valve.

The heat shield may comprise a piece of metal (or more generally, a metal member) bent around the at least part of the engine exhaust passage valve, the heat shield having a first open end to direct compressed air into the heat shield and a second open end to direct compressed air out of the heat shield. The system may further comprise an extended bracket coupled to the heat shield, the extended bracket connected to the air jet a positioned to direct compressed air into the first open end of the heat shield.

The heat shield may surround a position sensor of the engine exhaust valve and be configured to at least partially contain the compressed air around the position sensor via a plurality of interior walls of the heat shield. The heat shield may be a first heat shield and the air jet may be a first air jet, and the first air jet may be configured to direct compressed air onto an exterior of an exhaust gas recirculation (EGR) metering valve of an EGR system via the first heat shield, the EGR system configured to selectively route exhaust from a subset of cylinders of the engine to an intake of the engine via the EGR metering valve and to atmosphere via an EGR bypass valve.

The system may further comprise a second air jet and a second heat shield, the second air configured to direct compressed air onto an exterior of the EGR bypass valve via the second heat shield; and a third air jet and a third heat shield, the third air jet configured to direct compressed air onto an exterior of a turbine bypass valve of a turbocharger via the third heat shield, the turbocharger including a turbine and a compressor, wherein air flow through the turbine is controlled by the turbine bypass valve.

The compressed air provided to the first, second, and third air jets may be routed from downstream of the compressor. The first air jet may be configured to direct a larger amount of compressed air than the second and third air jets. The turbocharger may be a high-pressure turbocharger. The system may further comprise a low-pressure turbocharger, and the compressed air provided to the first, second, and third air jets may be routed from downstream of the compressor of the high-pressure turbocharger. The air jet may be fluidly coupled to at least one of a passage downstream of a turbocharger compressor or a compressed air system, for the air jet to receive the compressed air from said at least one of the passage or the compressed air system.

In an embodiment, the heat shield (which surrounds at least a part of an engine exhaust passage valve positioned in an engine exhaust passage of an engine and into which an air jet is configured to direct compressed air for cooling the at least a part of the engine exhaust passage valve) is a component whose only functions (aside from incidental functions unrelated to engine operation) are to act as a heat shield for the at least a part of the engine exhaust passage valve and to at least partially contain the compressed air around the at least a part of the engine exhaust passage valve. As opposed to engine structural components, shrouds or housings of the engine, etc., which might be said to slightly shield or contain air around such a component, but likely not to an extent to noticeably affect component cooling, and in any event which perform other functions and are not provided primarily for acting as heat shields and to contain air around engine exhaust passage valves or portions thereof.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   a heat shield surrounding at least a part of an engine exhaust passage valve positioned in an engine exhaust passage of an engine;
   an air jet configured to direct compressed air into the heat shield, the heat shield configured to at least partially contain the compressed air around an exterior of the at least part of the engine exhaust passage valve; and
   an extended bracket coupled to the heat shield, the heat shield comprising a metal member bent around the at least part of the engine exhaust passage valve, the heat shield having a first open end to direct the compressed air into the heat shield and a second open end to direct the compressed air out of the heat shield, the air jet connected to the extended bracket and positioned, by the extended bracket, to direct the compressed air into the first open end of the heat shield.

2. The system of claim 1, wherein the heat shield surrounds a position sensor of the engine exhaust passage valve and is configured to at least partially contain the compressed air around the position sensor with a plurality of interior walls of the heat shield.

3. A system, comprising:
   a heat shield surrounding at least a part of an exhaust passage valve positioned in an engine exhaust passage of an engine;
   an air jet configured to direct compressed air into the heat shield, the heat shield configured to at least partially contain the compressed air around an exterior of the at least part of the engine exhaust passage valve, wherein the heat shield is a first heat shield and the air jet is a first air jet, and wherein the first air jet is configured to direct compressed air onto an exterior of an exhaust gas recirculation (EGR) metering valve of an EGR system via the first heat shield, the EGR system configured to selectively route exhaust from a subset of cylinders of the engine to an intake of the engine via the EGR metering valve and to atmosphere via an EGR bypass valve; and
   the system further comprises:
   a second air jet and a second heat shield, the second air jet configured to direct compressed air onto an exterior of the EGR bypass valve via the second heat shield; and
   a third air jet and a third heat shield, the third air jet configured to direct compressed air onto an exterior of a turbine bypass valve of a turbocharger via the third heat shield, the turbocharger including a turbine and a compressor, wherein air flow through the turbine is controlled by the turbine bypass valve.

4. The system of claim 3, wherein the compressed air provided to the first, second, and third air jets is routed from downstream of the compressor, and wherein the first air jet is configured to direct a larger amount of compressed air than the second and third air jets.

5. The system of claim 3, wherein the turbocharger is a high-pressure turbocharger, wherein the system further comprises a low-pressure turbocharger, and wherein the compressed air provided to the first, second, and third air jets is routed from downstream of the compressor of the high-pressure turbocharger.

6. The system of claim 1, wherein the air jet is fluidly coupled to at least one of a passage downstream of a turbocharger compressor or a compressed air system, for the air jet to receive the compressed air from said at least one of the passage or the compressed air system.

7. A method, comprising:
   directing compressed air onto an exterior of an engine exhaust passage valve via a nozzle of an air jet, the compressed air at least partially contained around the engine exhaust passage valve by a heat shield, the heat shield comprising a first wall and a second wall opposite the first wall and having a width between the first wall and the second wall, the heat shield further comprising an opening extending across the width between the first wall and the second wall, the nozzle positioned between and spaced apart from each of the first wall and the second wall and surrounded by the opening on each side of the nozzle.

8. The method of claim 7, further comprising routing the compressed air into the opening of the heat shield and around the engine exhaust passage valve, and wherein the compressed air is at least partially contained around the heat shield by a plurality of interior walls of the heat shield.

9. The method of claim 8, wherein the heat shield at least partially surrounds a position sensor of the engine exhaust passage valve, and wherein routing the compressed air into the heat shield and around the engine exhaust passage valve comprises routing the compressed air around the position sensor.

10. The method of claim 8, wherein directing the compressed air comprises routing intake air from downstream of a turbocharger compressor to the air jet.

11. The method of claim 10, further comprising adjusting an air control valve downstream of the compressor to route the intake air to the air jet, the air control valve adjusted responsive to a temperature of the engine exhaust passage valve.

12. The method of claim 8, wherein directing the compressed air comprises routing air from a compressed air system to the air jet.

13. The method of claim 12, further comprising adjusting an air control valve downstream of the compressed air system to route the air to the air jet.

14. The method of claim 13, wherein the air control valve is adjusted responsive to one or more of a temperature of the engine exhaust passage valve or an engine operating condition.

15. The method of claim 7, wherein the engine exhaust passage valve is an oil control valve, an exhaust gas recirculation valve, or a turbine bypass valve, and wherein the first wall and second wall each have a length extending along a first axis of the heat shield, the width of the heat shield extending along a second axis perpendicular to the first axis.

16. A method, comprising:
reducing heat radiated to an engine exhaust passage valve with a heat shield at least partially covering an exterior of the engine exhaust passage valve;
directing air from a compressed air system to vehicle air brakes responsive to a braking request; and
during select operating conditions, directing air from the compressed air system onto the exterior of the engine exhaust passage valve by directing the air into the heat shield via a nozzle of an air jet, the heat shield comprising a first wall and a second wall opposite the first wall and having a width between the first wall and the second wall, the heat shield further comprising an opening extending across the width between the first wall and the second wall, the nozzle positioned between and spaced apart from each of the first wall and the second wall and surrounded by the opening on each side of the nozzle.

17. The method of claim 16, wherein the select operating conditions comprise one or more of a temperature of the engine exhaust passage valve being above a threshold temperature or engine operation.

18. The method of claim 16, wherein directing air on the exterior of the engine exhaust passage valve comprises directing air from the air jet to an open end of the heat shield and over the exterior of the engine exhaust passage valve in a direction parallel to a flow of exhaust through the engine exhaust passage valve.

* * * * *